US008203096B2

(12) United States Patent
Sanders et al.

(10) Patent No.: US 8,203,096 B2
(45) Date of Patent: Jun. 19, 2012

(54) WEARABLE AUTONOMOUS MATERIAL PROCESSING SYSTEM

(75) Inventors: Nicholas A. Sanders, Norwich, VT (US); E. Michael Shipulski, Etna, NH (US); Mike Hoffa, Lebanon, NH (US); Jay L. Jason, Claremont, NH (US)

(73) Assignee: Hypertherm, Inc., Hanover, NH (US)

( * ) Notice: Subject to any disclaimer, the term of this patent is extended or adjusted under 35 U.S.C. 154(b) by 289 days.

(21) Appl. No.: 11/852,855

(22) Filed: Sep. 10, 2007

(65) Prior Publication Data

US 2008/0061040 A1    Mar. 13, 2008

Related U.S. Application Data

(63) Continuation-in-part of application No. 11/518,858, filed on Sep. 11, 2006, now Pat. No. 7,615,719.

(51) Int. Cl.
*B23K 10/00* (2006.01)
(52) U.S. Cl. ........... 219/121.48; 219/121.39; 219/130.1; 219/121.59
(58) Field of Classification Search ............. 219/121.48, 219/121.45, 121.46, 121.49, 121.54, 121.39, 219/130.1, 86.21; 417/313; 136/252
See application file for complete search history.

(56) References Cited

U.S. PATENT DOCUMENTS

| | | | |
|---|---|---|---|
| 3,309,497 A | 3/1967 | Kensrue | |
| 4,182,949 A | 1/1980 | Powers et al. | |
| 4,525,621 A | 6/1985 | Puschner | 219/137 PS |
| 5,070,227 A | 12/1991 | Luo et al. | 219/121.55 |
| 5,086,205 A | 2/1992 | Thommes | |
| 5,225,657 A | 7/1993 | Blankenship | |
| 5,250,786 A | 10/1993 | Kikuchi et al. | 219/130.32 |
| 5,472,024 A * | 12/1995 | Brugerolle et al. | 141/95 |
| 6,051,809 A | 4/2000 | Colella | |
| 6,111,215 A | 8/2000 | Lilly | |
| 6,194,682 B1 | 2/2001 | Schneider et al. | 219/121.55 |
| 6,225,596 B1 * | 5/2001 | Chandler et al. | 219/130.1 |

(Continued)

FOREIGN PATENT DOCUMENTS

CA    1 090 428    11/1980

(Continued)

OTHER PUBLICATIONS

International Search Report for International Application No. PCT/US2007/078044, Date of Mailing Dec. 3, 2007, including Written Option of the International Searching Authority (13 pages total).

(Continued)

*Primary Examiner* — Mark Paschall
(74) *Attorney, Agent, or Firm* — Proskauer Rose LLP

(57) ABSTRACT

A portable plasma arc torch system can be used for processing materials. The system includes a replaceable or rechargeable power source and replaceable or rechargeable gas source. A controller communicates with at least one of the power source or the gas source. A plasma delivery device received via the controller current from the power source and gas from the gas source to generate a plasma arc at an output of the plasma delivery device. The plasma arc can be used to process materials such as metallic workpieces. The plasma arc torch can include a wearable portable assembly which includes the replaceable or rechargeable power and gas source. A plasma delivery device receives current from the power source in the assembly and gas from the gas source in the assembly to generate a plasma arc.

21 Claims, 16 Drawing Sheets

U.S. PATENT DOCUMENTS

| | | | |
|---|---|---|---|
| 6,331,694 B1 | 12/2001 | Blankenship | 219/137 PS |
| 6,406,759 B1 | 6/2002 | Roth | |
| 6,444,944 B2 | 9/2002 | Schneider et al. | |
| 6,476,354 B1 | 11/2002 | Jank et al. | 219/137 PS |
| 6,479,795 B1 | 11/2002 | Albrecht et al. | 219/137.2 |
| 6,512,201 B2 | 1/2003 | Blankenship | |
| 6,552,303 B1 | 4/2003 | Blankenship et al. | 219/130.5 |
| 6,747,246 B2 | 6/2004 | Crandell, III | 219/130.1 |
| 6,777,649 B2 | 8/2004 | Reynolds et al. | |
| 6,818,860 B1 | 11/2004 | Stava et al. | |
| 6,977,358 B2 | 12/2005 | Albrecht et al. | 219/130.1 |
| 6,982,398 B2 | 1/2006 | Albrecht | 219/133 |
| 7,183,517 B2 | 2/2007 | Albrecht et al. | 219/130.4 |
| 7,188,645 B2 | 3/2007 | Bender et al. | |
| 7,355,141 B2 | 4/2008 | Albrecht et al. | 219/74 |
| 7,423,238 B2 * | 9/2008 | Stanzel et al. | 219/137.2 |
| 2001/0042736 A1 | 11/2001 | Schneider et al. | 219/121.55 |
| 2002/0023908 A1 | 2/2002 | Blankenship | 219/130.1 |
| 2002/0187066 A1 | 12/2002 | Yu et al. | |
| 2004/0069752 A1 | 4/2004 | Ulrich et al. | 219/121.39 |
| 2005/0000946 A1 * | 1/2005 | Albrecht et al. | 219/74 |
| 2005/0073282 A1 | 4/2005 | Carrier et al. | 320/106 |
| 2005/0077878 A1 | 4/2005 | Carrier et al. | 320/134 |
| 2005/0109748 A1 | 5/2005 | Albrecht et al. | 219/130.1 |
| 2005/0111995 A1 * | 5/2005 | Everson | 417/313 |
| 2005/0252889 A1 | 11/2005 | Stanzel et al. | 219/74 |
| 2005/0252890 A1 | 11/2005 | Stanzel et al. | 219/74 |
| 2005/0252899 A1 | 11/2005 | Stanzel et al. | 219/137.2 |
| 2005/0263514 A1 | 12/2005 | Albrecht | 219/133 |
| 2006/0124638 A1 | 6/2006 | Jensen | 219/765 |
| 2006/0138113 A1 | 6/2006 | Ott | 219/132 |
| 2007/0181547 A1 | 8/2007 | Vogel et al. | 219/130.1 |
| 2007/0187376 A1 | 8/2007 | Albrecht et al. | 219/130.1 |
| 2007/0221628 A1 | 9/2007 | Stanzel et al. | |
| 2007/0257084 A1 | 11/2007 | Carrier et al. | |
| 2008/0029153 A1 * | 2/2008 | Margalit | 136/252 |
| 2009/0057285 A1 * | 3/2009 | Bashore et al. | 219/130.1 |

FOREIGN PATENT DOCUMENTS

| | | |
|---|---|---|
| CN | 86210798 U | 10/1987 |
| CN | 2682717 Y | 3/2005 |
| DK | 83 08 999.3 | 11/1983 |
| EP | 1 500 456 | 1/2005 |
| EP | 1 535 691 A2 | 6/2005 |
| EP | 1 629 926 A2 | 3/2006 |
| EP | 1 852 206 | 11/2007 |
| GB | 1 453 100 | 10/1976 |
| GB | 2 316 244 A | 2/1998 |
| JP | 356077068 A | 6/1981 |
| JP | 401245972 | 10/1989 |
| JP | 401245972 A | 10/1989 |
| WO | 2005/026650 | 3/2005 |

OTHER PUBLICATIONS

International Search Report for International Application No. PCT/US2008/075788, Date of Mailing Oct. 9, 2009, including Written Opinion of the International Searching Authority (17 pages total).

* cited by examiner

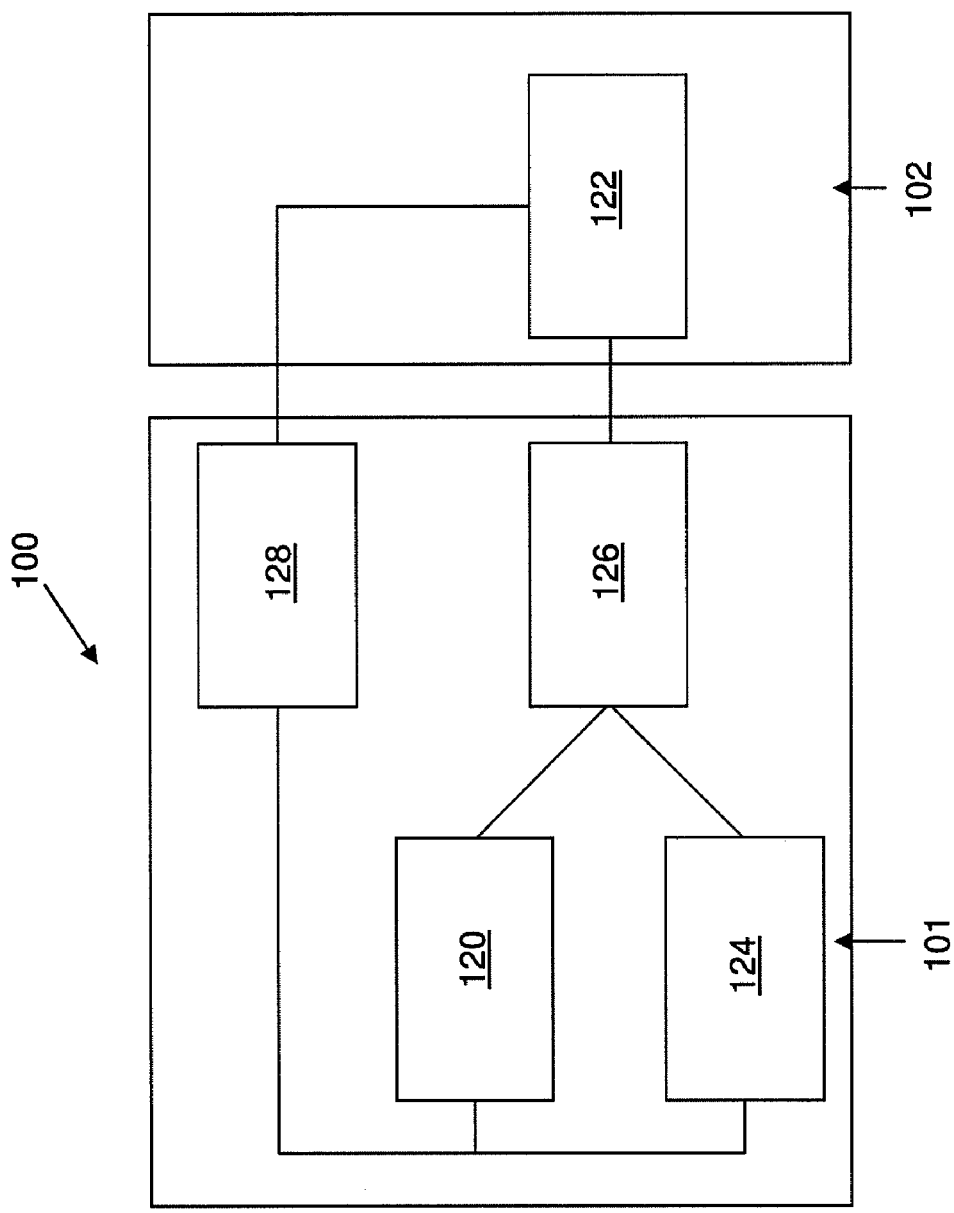

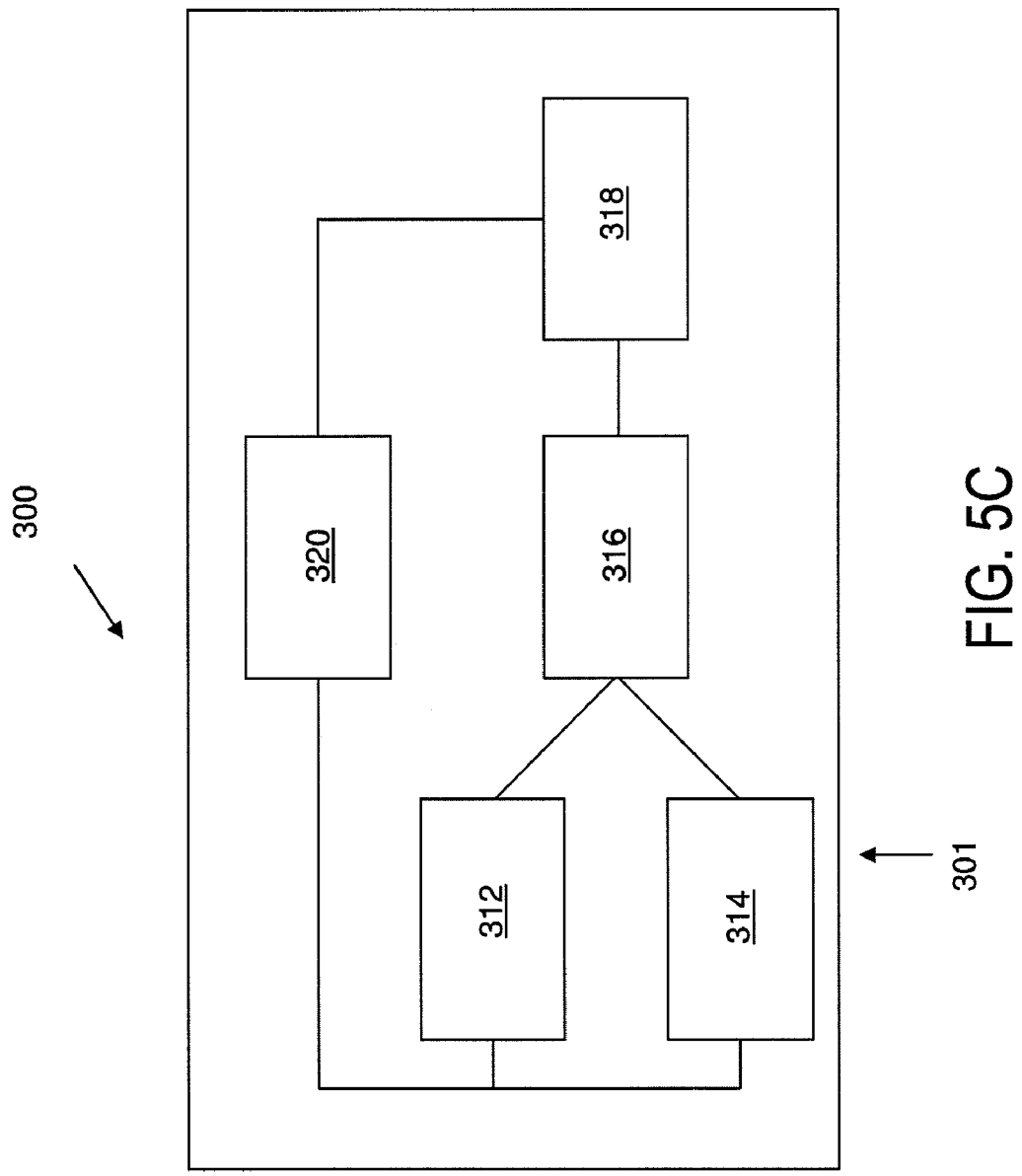

WEARABLE AUTONOMOUS MATERIAL PROCESSING SYSTEM

RELATED APPLICATIONS

This application is a continuation-in-part of U.S. Ser. No. 11/518,858 entitled "Autonomous Plasma Cutting System" filed on Sep. 11, 2006 now U.S. Pat. No. 7,615,719. This application claims priority to U.S. Ser. No. 11/518,858.

TECHNICAL FIELD

The technology relates generally to portable tools for processing materials. In particular, the technology relates to portable, held-held plasma arc torch systems for processing materials.

BACKGROUND

Plasma arc torch systems can be applied to a wide variety of material processing applications such as cutting the thin plates of metal used for heating, ventilation and air conditioning systems or thick plates of steel. Traditionally, plasma arc torch systems are not portable because they require a large, cumbersome gas source (or a continuous, fixed gas source) and large amounts of power drawn from the electrical power grid via a corded attachment.

Despite cordless power tools being pervasive in the commercial market, plasma arc torch systems have yet to be efficiently adapted for easy, portable usage. One design difficulty is caused by the relatively large gas consumption of a plasma arc torch. Another design difficulty is caused by the high power requirements of the plasma arc torch system, e.g., about 1.32 kW output for a low power system such as the Powermax™ 190C manufactured by Hypertherm, Inc. of Hanover, N.H.; 8.4 kW output for a medium power torch system such as the Powermax 1000 manufactured by Hypertherm and up to 16,000 kW output for a high power torch system such as the Powermax 1650 manufactured by Hypertherm. There exists a difficult balance between the performance of the torch, the lifetime of the gas and power sources, and actual physical size of the plasma arc torch system.

It is therefore desirable to provide a portable plasma arc torch system that has power considerations for operating the torch effectively at lower gas consumption and lower power levels, while providing portability and performance for the applications described above. Additionally, it is desirable for the gas and power sources of the plasma arc torch system to operate for a commercially useful duration with ease of recharge or replacement for repeatable use.

SUMMARY OF THE TECHNOLOGY

The technology represents an advance in the plasma processing industry in that embodiments of the technology are portable systems that can process materials without the need for a large, cumbersome gas source (or a continuous, fixed gas source) and without being continuously connected to the electrical power grid. As such, embodiments of the technology can be used at construction sites, in agricultural areas, by emergency safety personnel (e.g., firefighters, police, etc.), by workers in remote locations where connectivity to the electrical power grid is not possible, or by consumers in their own backyards.

In one aspect, the technology features a plasma arc torch apparatus for processing materials. The plasma arc torch apparatus includes a wearable portable assembly that includes at least one of a replaceable or rechargeable power source or a replaceable or rechargeable gas source. The apparatus also includes a plasma delivery device receiving current from the power source and gas from the gas source to generate a plasma arc. In some embodiments, the wearable portable assembly is a backpack. In some embodiments, the portable assembly includes a layer that is thermal resistant, electrically non-conductive, and/or impact resistant.

In some embodiments, the plasma arc torch apparatus includes a remote control device adapted to communicate with at least one of the power source or the gas source. The apparatus can include a control device on the plasma delivery device adapted to communicate with at least one of the power source or the gas source. In some embodiments, the plasma arc torch apparatus includes at least one of an indicator of power remaining in the power source or an indicator of a remaining gas in the gas source.

In some embodiments, the gas source includes a compressor that compresses gas to be delivered to the plasma delivery device. The power source can power a compressor to recharge the gas source. In some embodiments, the plasma delivery device is attachable to the wearable portable assembly. The portable assembly can be attachable to a charging device configured to charge at least one of the power source or the gas source. In some embodiments, the portable assembly includes a filament wound composite tank. The plasma arc torch assembly can include a current regulator for regulating the current received by the plasma delivery device from the power source. In some embodiments, the power source is a polymer lithium ion battery.

In another aspect, the technology features a system including a wearable portable assembly. In some embodiments, the wearable portable assembly is a backpack. The wearable portable assembly includes a plasma arc torch system having at least one of a replaceable or rechargeable power source or a replaceable or rechargeable gas source. The system includes a docking station attachable to the assembly. The docking station includes at least one of a power supply for recharging the power source or a gas supply for recharging the gas source.

In another aspect, the technology features a method for processing materials. The method includes providing a plasma delivery device in communication with a wearable portable assembly. The assembly having at least one of a replaceable or rechargeable power source or a replaceable or rechargeable gas source. The method includes generating a plasma arc emanating from the plasma delivery device while the assembly is worn by a user, by providing thereto current from the power source and gas from the gas source.

In yet another aspect, the technology features a device for charging a portable plasma arc torch apparatus. The device includes a docking port configured to receive the portable plasma arc torch apparatus, the portable plasma arc torch apparatus including a rechargeable power source and rechargeable gas source. The device includes a first connector configured to electrically couple to the power source when the apparatus is docked to the docking port, the first connector providing power to recharge the power source. The device also includes a second connector configured to fluidly couple to the gas source when the apparatus is docked to the docking port, the second connector providing gas to recharge the gas source. In some embodiments, the portable plasma arc torch apparatus is wearable. In some embodiments, at least one of the power source and gas source is removable.

In another aspect, the technology features a device for charging a portable welding apparatus. The device includes a docking port configured to receive the portable welding apparatus, the portable welding apparatus including a rechargeable power source and rechargeable gas source. The device includes a first connector configured to electrically couple to the power source when the apparatus is docked to the docking port, the first connector providing power to recharge the power source. The device also includes a second connector configured to fluidly couple to the gas source when the apparatus is docked to the docking port, the second connector providing gas to recharge the gas source.

In another aspect, the technology features a welding apparatus. The apparatus includes a a wearable portable assembly, including at least one of a replaceable or rechargeable power source or a replaceable or rechargeable gas source. The apparatus also includes a welding delivery device receiving current from the power source and gas from the gas source to generate a welding arc.

In another aspect, the technology features a portable plasma arc torch system that can be used for processing materials (e.g., cutting, piercing, marking or scoring metallic workpieces). In some embodiments, the system includes a replaceable or rechargeable power source, such as one or more batteries. The system also includes a replaceable or rechargeable gas source disposed relative to the power source. The gas source can be disposable or refillable (e.g., one or more gas containers). In some embodiments, the gas source can be a continuous source of gas (e.g., a compressor). In some embodiments, the power source and the gas source are stored in a portable enclosure.

In some embodiments, a controller communicates with at least one of the power source or the gas source. The controller can include electrical controls and fluid controls. A plasma delivery device (e.g., a plasma arc torch) uses current and voltage from the power source and gas from the gas source to generate a plasma arc at an output of the plasma delivery device. The plasma arc can be used to process materials such as metallic workpieces.

The controller is electrically connected to the power source, the gas source and a plasma delivery device by a communication path (e.g., a bus, a wireless connection, etc.). In some embodiments, a transmission medium provides electrical and a fluid communication paths the power source and the plasma delivery device and the gas source and the plasma delivery device, respectively. The power source is in electrical communication with the plasma delivery device via an electrical communication path (e.g., an electrical lead set, a wireless connection, etc.). The gas source is in fluid communication with the plasma delivery device via a fluid conduit. In some embodiments, the electrical lead set, the fluid conduit and the plasma delivery device can be storable in the portable enclosure. In addition, the enclosure is transportable and can be a hand-held housing and/or a briefcase-sized housing.

In another aspect, the technology also features a portable plasma arc torch system that can be used for cutting a workpiece. The system can include a portable enclosure with a replaceable or rechargeable power means and a replaceable or rechargeable gas means disposed within the enclosure. A control means and a transmission means are in communication the power means and the gas means. A plasma delivery means receives current and voltage from the power means and gas from the gas means to generate a plasma arc that can be used for cutting a workpiece.

The control means can be in electrical communication with the power means, the gas means and the plasma delivery means. The transmission means provides electrical and fluid communication paths from the power means and gas means to the plasma delivery means. The power means is in electrical communication with the plasma delivery means via an electrical communication path (e.g., an electrical lead set, a wireless connection, etc.). The gas means is in fluid communication with the plasma delivery means via a fluid conduit. In some embodiments, the electrical lead set, the fluid conduit and the plasma delivery means can be storable in the portable enclosure. The enclosure is transportable and can be a hand-held housing and/or a briefcase-sized housing.

BRIEF DESCRIPTION OF THE DRAWINGS

The foregoing and the technology will be more fully understood from the following description of various embodiments, when read together with the accompanying figures.

FIG. 5a is an example of a physical partitioning of the functional implementation with the plasma delivery device in one partition and connected to the power means, controller and transmission medium housed in another partition.

FIG. 5c is a variation of FIG. 5a with all components of the system housed in a single partition.

DETAILED DESCRIPTION

Plasma arc torches have a wide variety of applications such as the cutting of thick plates of steel and the cutting of comparatively thin sheets of galvanized metal commonly used in heating, ventilating and air conditioning (HVAC) systems. The basic components of a plasma arc torch include a torch body, an electrode (cathode) mounted within the body, a nozzle (anode) with a central exit orifice, a gas source to provide a flow of an ionizable gas, electrical connections, passages for cooling and arc control fluids, and a power source that produces a pilot arc in the gas, typically between the electrode and the nozzle, and then a plasma arc, a conductive flow of the ionized gas from the electrode to a workpiece. The gas can be non-oxidizing, e.g. nitrogen, argon/hydrogen, or argon, or oxidizing, e.g. oxygen or air.

Various plasma arc torches of this general type are described in U.S. Pat. Nos. 4,791,268; 4,902,871; 5,170,033; 5,317,126; and 5,994,663, all commonly assigned with the present application. Plasma arc torches and related products are sold in a variety of models by a number of manufacturers including Hypertherm. The Powermax 1000 brand torch sold by Hypertherm is typical of the medium power torches, using H35 (35% H 65% Ar) and N2 or H35 and air as the working gas and useful for both plate fabrication and HVAC applications. The Powermax 1650 brand torch sold by Hypertherm is typical of the high power torches often using H35 and N2 as the working gas. High power torches can be water-cooled and used to pierce and cut thick metal sheets, e.g. 1 inch thick mild steel plate.

Figure 1:
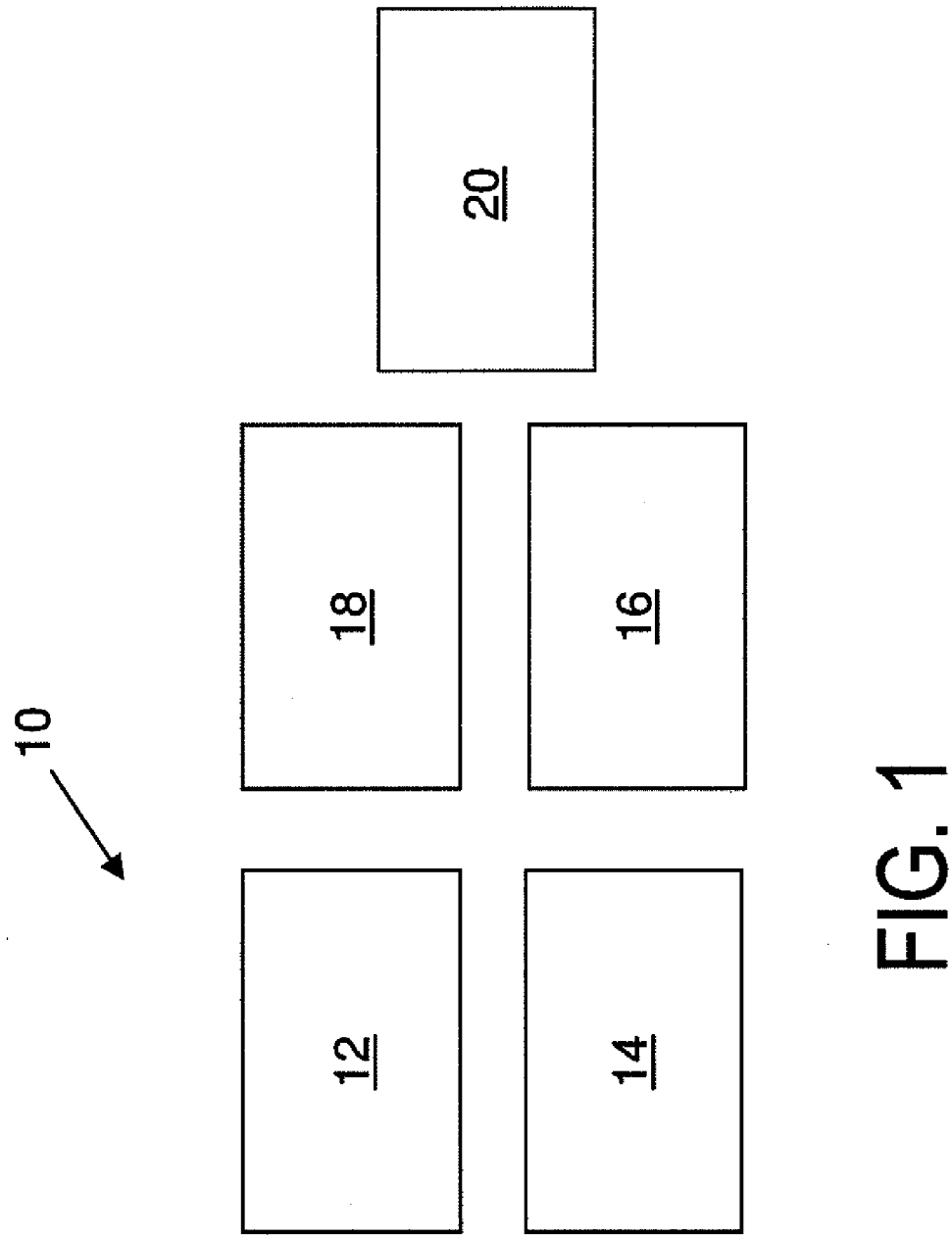
FIG. 1 is a block diagram showing the representative functional components of an autonomous plasma arc torch system.

Referring now to FIG. 1, a block diagram showing representative functional components of a plasma arc torch system 10 is shown. This plasma arc torch system is "autonomous" in that it is a portable system capable of processing metallic materials without large, bulky gas canisters (and, in some embodiments, without a continuous, fixed gas source) and without connection to the electrical power grid by a power cord. In various embodiments, the system is mobile and transportable. In some embodiments, the system can be disposed in a "briefcase-sized" (and/or hand-held) housing that can be hand-carried or otherwise transported to local and remote locations for use. In other embodiments, the system may be more compact, including a plasma delivery device that can be charged and removed from a power source disposed in a briefcase-sized housing for remote use (e.g., a system comparable in size to that of a cordless drill). It is expected that embodiments of the technology can be used at construction sites, in agricultural areas, by emergency safety personnel (e.g., firefighters, police, etc.), by workers in remote locations where connectivity to the electrical power grid is not possible or desirable, or by consumers in their own backyards.

In one exemplary embodiment, the system 10 includes five primary components: a power source 12, a gas source 14, a transmission medium 16, a controller 18 and a plasma delivery device 20. The power source 12 can be rechargeable and/or replaceable (e.g., one or more batteries). The gas source 14 can be one or more replaceable and/or rechargeable gas containers or a portable compressor. The transmission medium 16, which can include an electrical transmission capability and/or a fluid transmission capability, is connected to the plasma delivery device 20. The electrical transmission capability can include an electrical lead set, such as any of those manufactured by Hypertherm Inc., a bus or a wireless connection. The fluid transmission capability can include a fluid conduit. The controller 18 can include electrical controls and/or a fluid controls (e.g., a trigger, relay, solenoid valve, pressure regulator, etc.). The plasma delivery device 18 can include a plasma arc torch, such as those manufactured by Hypertherm, Inc. The torch can be started by manipulating a trigger (not shown) disposed on the device 18. In addition, the system 10 can include various user controls (not shown), such as a current limiting switch, a toggle switch, a key pad, a touch pad, dials, knobs or other means to enable a user to manipulate or otherwise control parameters of the torch. In some embodiments, features used in the autonomous plasma arc torch system 100 described herein can be applied to a portable welding apparatus (not shown).

Figure 2:
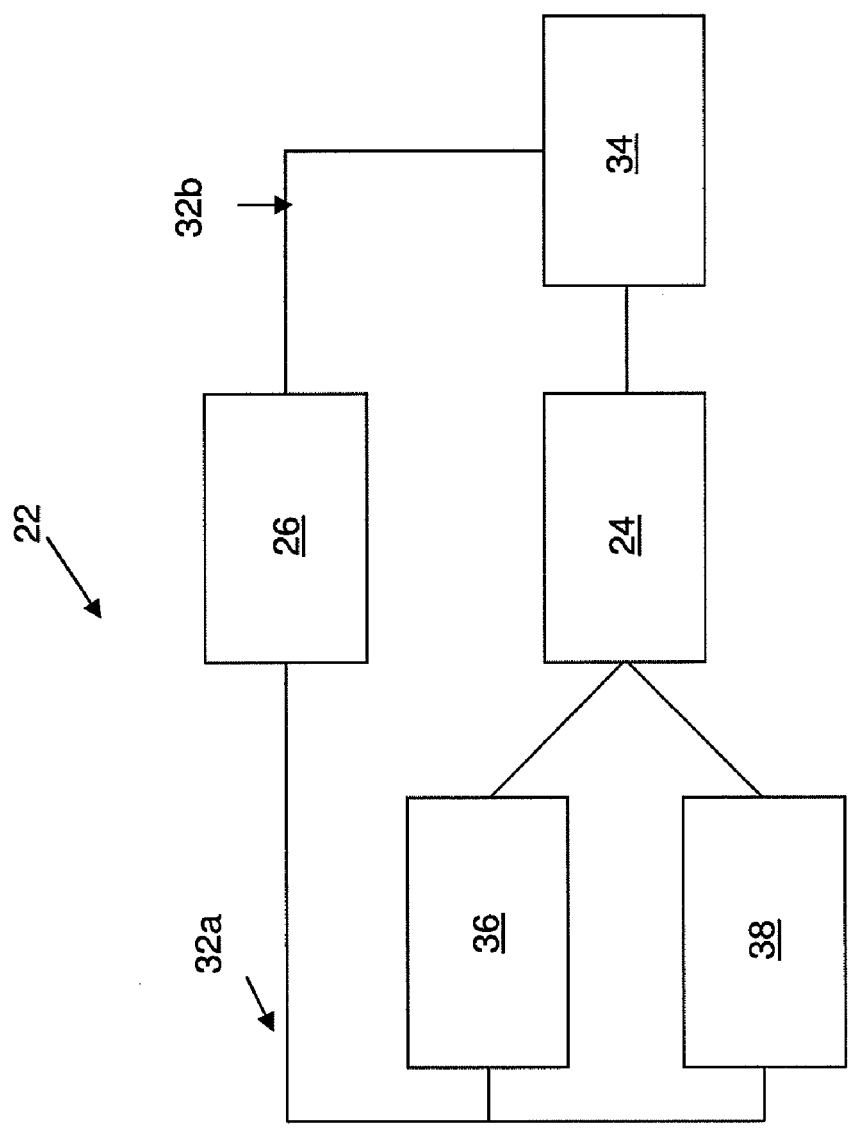
FIG. 2 is a block diagram showing an implementation of the representative components of an autonomous plasma arc torch system using a single control means and a single transmission medium.

FIG. 2 is a block diagram showing one exemplary implementation of the representative components of an autonomous plasma arc torch system 22 using a single transmission medium 24 and a single controller 26. The controller 26 communicates with the power source 28 and the gas source 30 via a common electrical connection 32 (e.g., a bus). In addition, the controller uses another electrical connection 32b to communicate with the plasma delivery device 34. The power source 36 provides current and the gas source 38 provides gas to the plasma delivery device 34 via the transmission medium 24. In one implementation, the transmission medium 24 comprises an electrical lead set for providing current from the power source 36 to the plasma delivery device 34, and a fluid conduit for providing gas from the gas source 38 to the plasma delivery device 34. The plasma delivery device 34 can be a plasma arc torch. The system 22 can also include user controls, as described previously, to control parameters of the torch. The representative components of the autonomous plasma arc torch system 22 can be applied to a portable welding apparatus.

Figure 3:
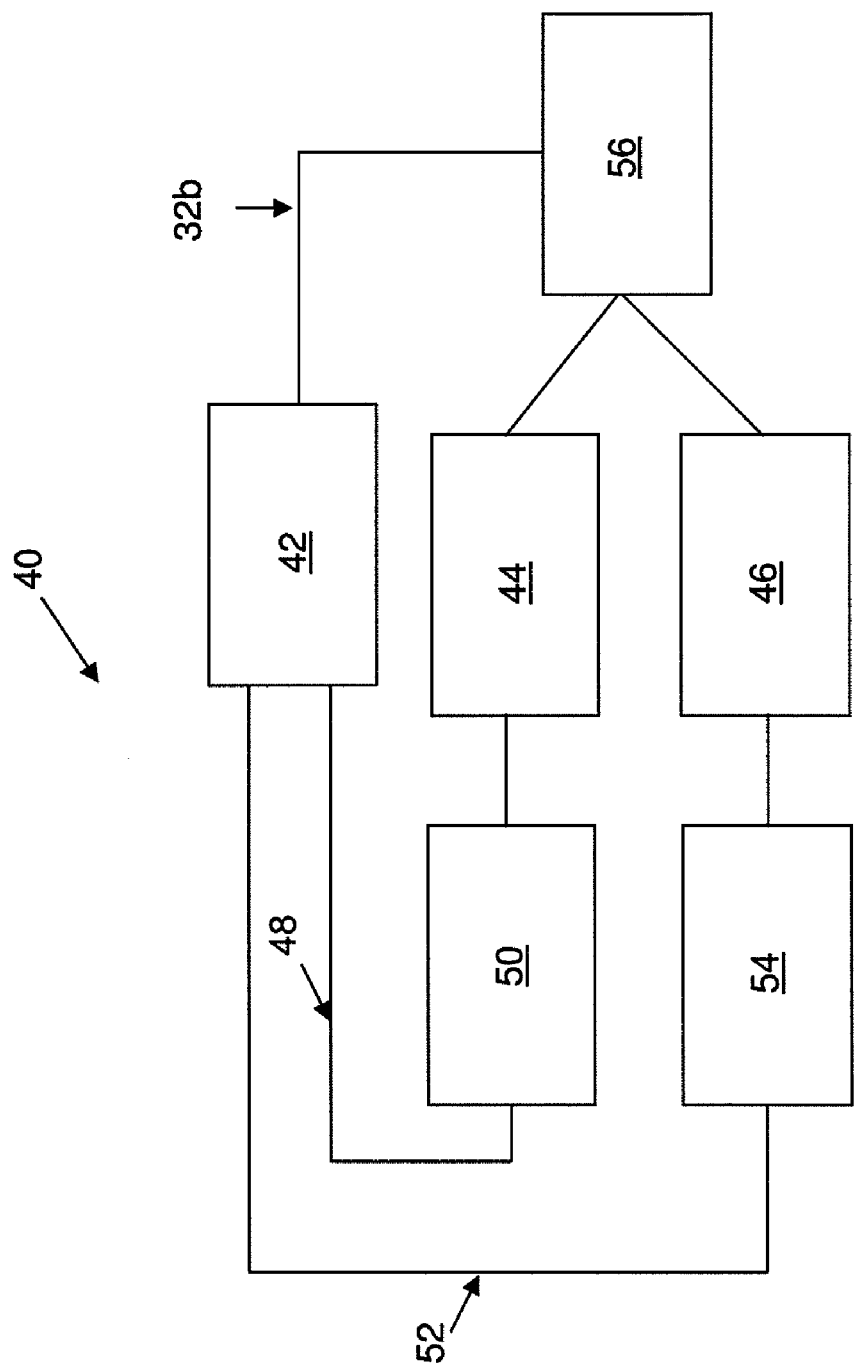
FIG. 3 is a block diagram showing a variation of the implementation of FIG. 2 using a single controller and a pair of transmission medium.

FIG. 3 is a block diagram showing another implementation of a portable plasma arc torch system 40. The system 40 uses a single controller 42 and a pair of transmission media 44, 46. The controller 42 communicates via a first electrical connection 48 with the power source 50 and communicates via another electrical connection 52 with the gas source 54. The controller 42 also communicates with the plasma delivery device 56. The power source 50 provides current to the plasma delivery device 56 via a transmission medium 44, and the gas source 54 provides gas to the plasma delivery device 56 via the transmission medium 46. The plasma delivery device 56 can be a plasma arc torch. The system 40 can also include user controls (not shown) to control parameters of the torch. In some embodiments, the implementation is used in a portable welding apparatus.

Figure 4:
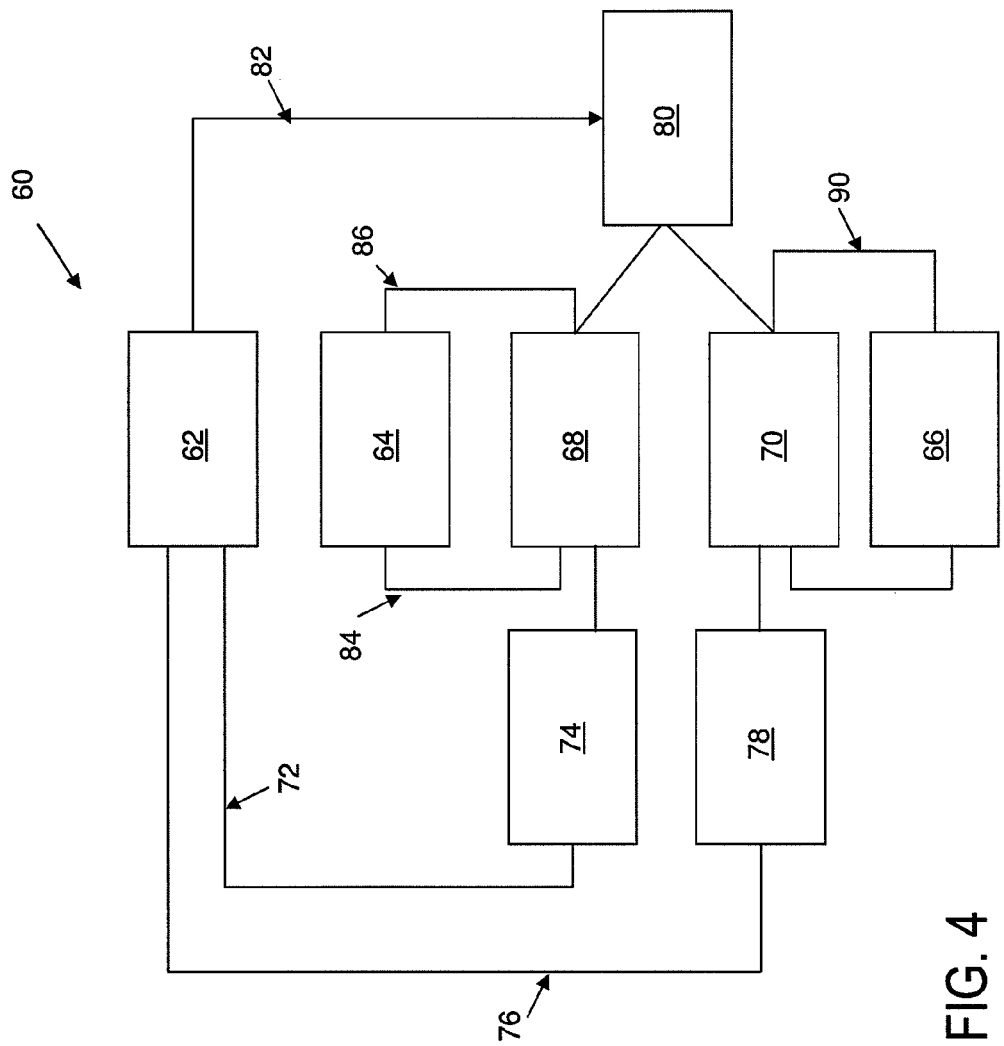
FIG. 4 is a block diagram showing a variation of the implementation of FIG. 2 using three controllers and two transmission media.

FIG. 4, a block diagram showing a variation of the implementation of a portable plasma arc torch system 60 using three controllers 62, 64, 66 and two transmission media 68 70. The controller 62 communicates via an electrical connection 72 with the power source 74 and via a separate electrical connection 76 with the gas source 78. The controller 62 communicates with the plasma delivery device 80 via another electrical connection 82. The controller 64 communicates with the transmission medium 68 via two electrical connections 84, 86. Similarly, the controller 66 communicates with the transmission medium 70 via two electrical connections 88, 90. The power means 74 provides current to the plasma delivery device 80 by way of transmission medium 68, and the gas source 78 provides gas to the plasma delivery device 80 by way of a transmission medium 70. The plasma delivery device 80, which can be a plasma arc torch, is positioned relative to a workpiece for cutting operations. The system 60 can also include user controls, as described previously. In some embodiments, the implementation is used in a portable welding apparatus.

FIGS. 5a, 5b, 5c and 5d are exemplary embodiments of various physical partitioning configurations of the autonomous plasma cutting system. In some embodiments, the various physical partitioning configurations are used in a portable welding apparatus.

FIG. 5a depicts a plasma torch system 100 partitioned into an enclosure section 101 and a torch section 102. In one embodiment, the two sections are stored in a single, briefcase-style housing (not shown). The housing can be hand-held to enable a user to carry the system 100 to a remote location. The enclosure section 101 includes a power source 120, gas source 124, transmission medium 126, and controller 128. The plasma delivery device 122 is located in the torch section 102.

Figure 5B:
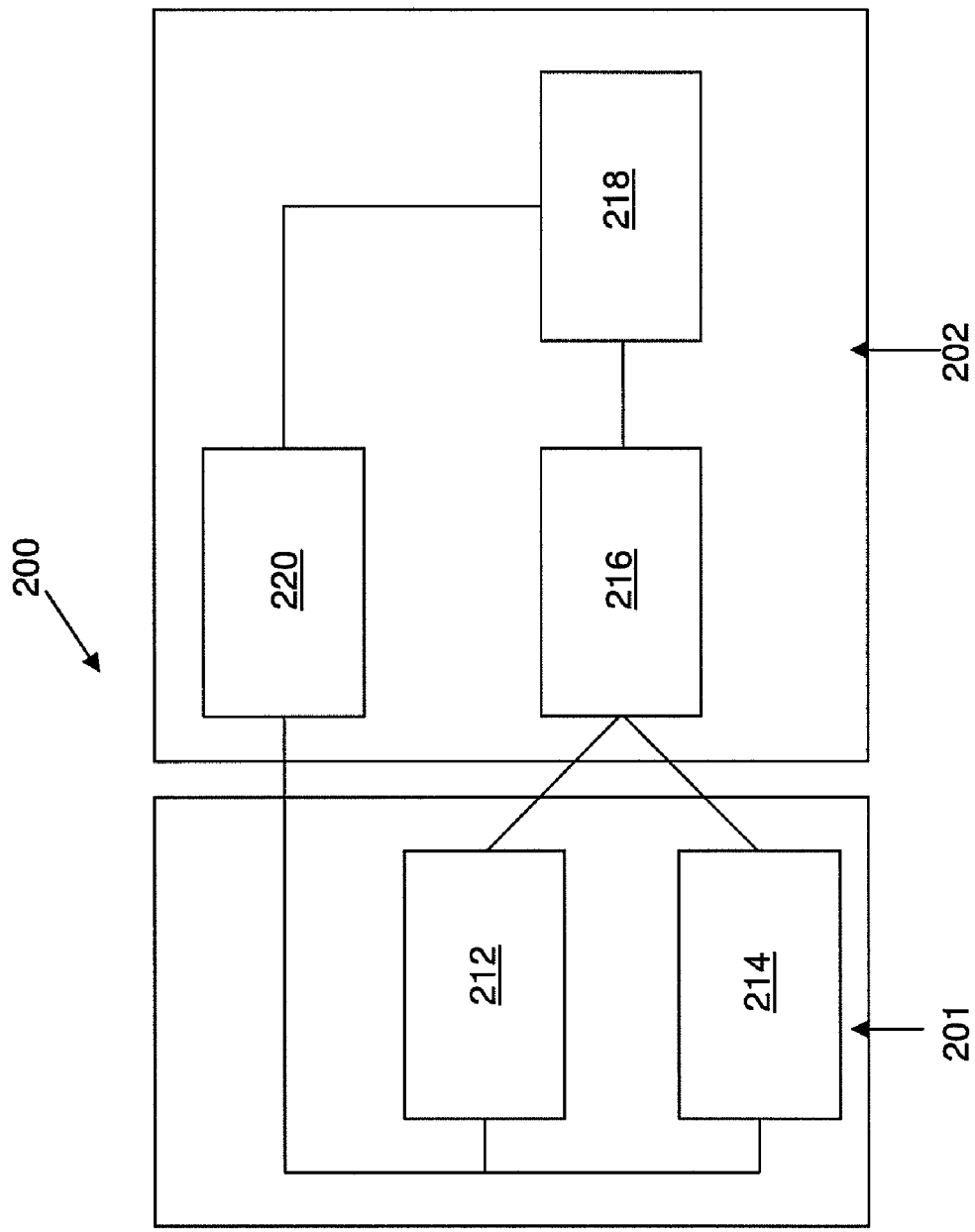
FIG. 5b is a variation of FIG. 5a with the plasma delivery, controller and transmission medium housed in one partition and connected to the power means and gas means housed in another partition.

FIG. 5b depicts a plasma torch system 200 partitioned into a torch attachment section 201 and a torch section 202. In one embodiment, the two sections are stored in a single, briefcase-style housing. The attachment section 201 can be thought of as analogous to a removable battery pack, except that it includes both a power source 212 and gas source 214. The torch section 202 includes a transmission medium 216, controller 220 and a plasma delivery device 218.

FIG. 5c depicts a plasma torch system 300 having the primary components in a single enclosure 301 (or housing). The enclosure section 301 includes a power source 312, gas source 314, transmission medium 316, controller 320, and plasma delivery device 318.

Figure 5D:
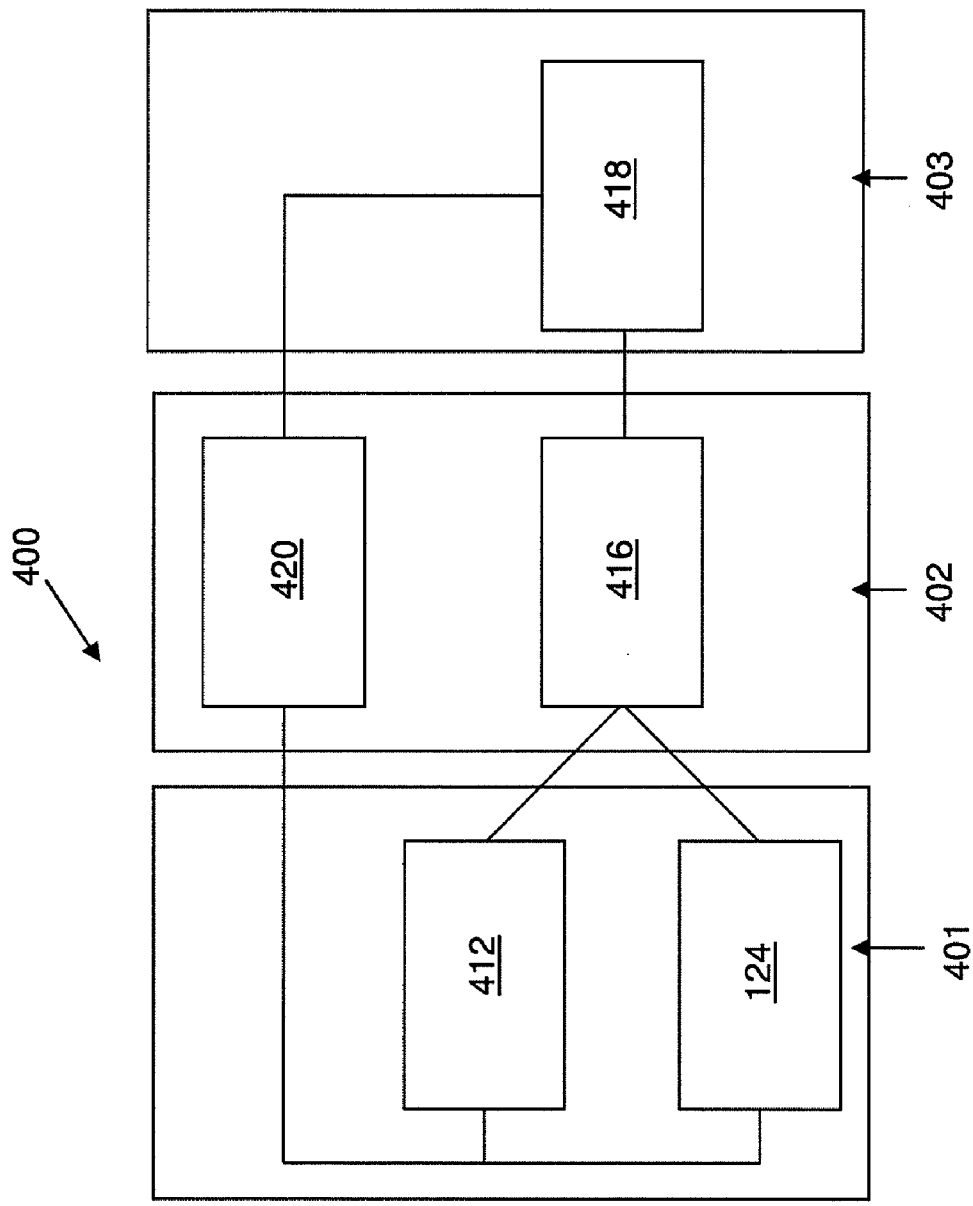
FIG. 5d is a variation of FIG. 5a with the plasma delivery device in one partition and connected to the control and transmission medium in a second partition, and connected to the power means and gas means, housed in a third partition.

FIG. 5d depicts a plasma torch system 400 that can be partitioned into an enclosure attachment section 401, an enclosure section 402 and a torch section 403. The enclosure section 402 includes a transmission medium 416 and a controller 418. The plasma delivery device 418 is located in the torch section 403. In one embodiment, the three sections are stored in a single, briefcase-style housing capable of being hand-carried by a user.

Figure 6:
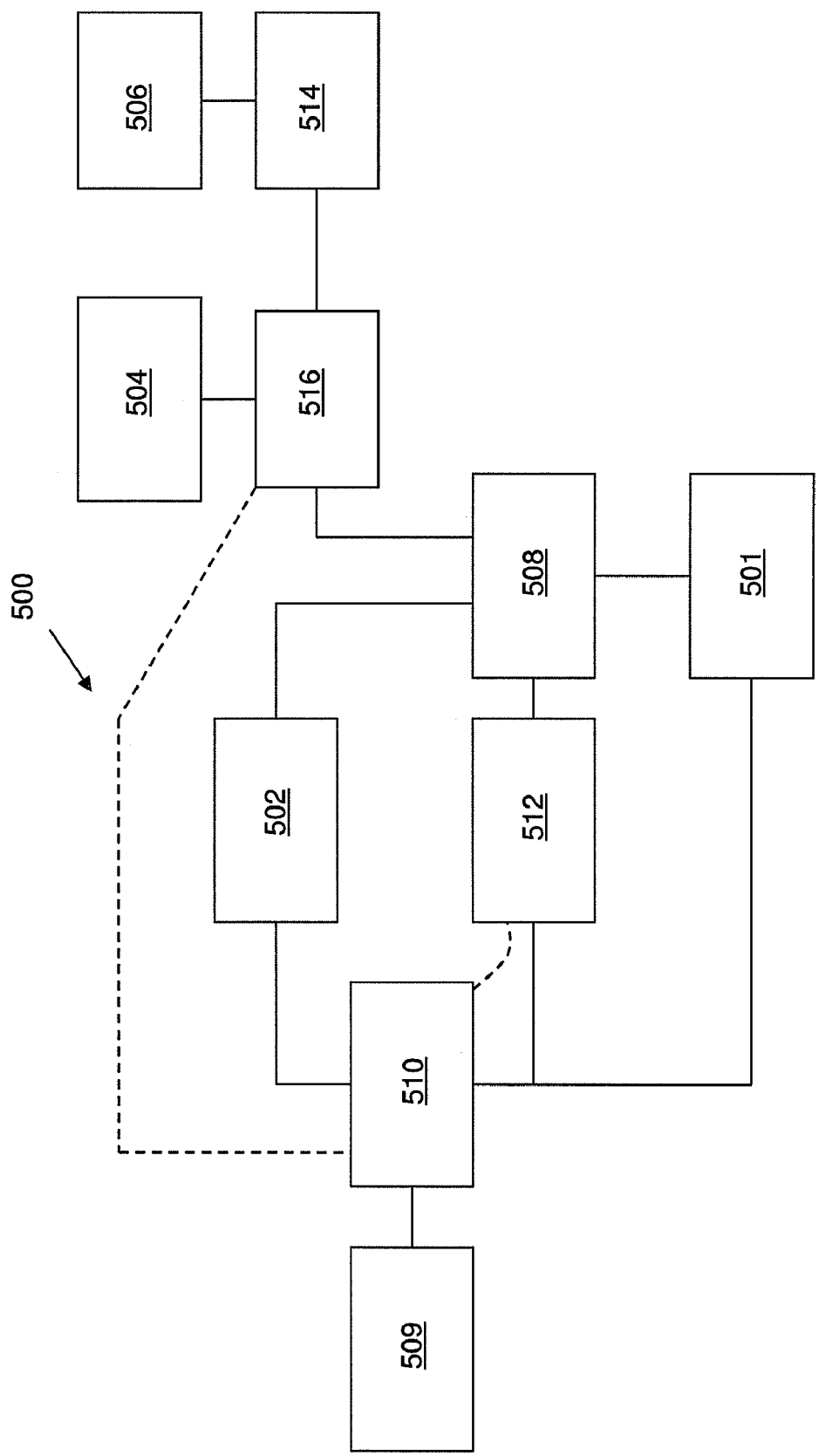
FIG. 6 is a detailed block diagram of an exemplary autonomous plasma arc torch system.

FIG. 6 is a detailed block diagram of an autonomous plasma arc torch system 500 capable of cutting a workpiece 501. The power system includes a pair of a rechargeable and/or replaceable power sources 502 and 504. In one detailed embodiment, the power source 502 is an acid lead battery with 12V, 1.3. Amps Hrs, maximum discharge current of 19.5 Amps, e.g. manufactured by IMC Power. In one detailed embodiment, the power source 502 is an Polymer Lithium Ion battery. In some embodiments, a boost converter can be used with the power source 608. The gas source 506 can be replaceable and/or rechargeable gas bottle. In one embodiment, the gas source 506 is a carbon fiber wrapped bottle with a 3,000 PSI capacity, e.g. manufactured by Pure Energy. An electrical lead set (not shown) provides a communication path between the power sources 502, 504 and the torch 508, and a fluid conduit (not shown) provides a fluid flow path between the gas source 506 and the torch 508.

The system includes a plasma arc torch 508, e.g., the PAC 105 hand torch manufactured by Hypertherm, Inc. The torch 508 can be turned on and off by manipulating the trigger 509. During operation, the torch 508 receives current and voltage from the power source 502 via a solid state relay 510. In one detailed embodiment, the relay 510 is a DC solid-state relay with output to 100A, 200 VDC, e.g. manufactured by Teledyne Relay. A pilot arc circuit 512, powered by the power source 502, is provided to generate a pilot arc within the torch 508. The circuit 512 can be a custom-design or any one of a variety of pilot arc circuits known in the art of plasma torch technology.

The gas source 506 provides a supply of gas to the torch 508 via a pressure regulator 514 and a solenoid valve 516. In one detailed embodiment, a pressure reducing regulator is employed having 3,000 PSI input, 2-80 PSI output and 100 PSI max (e.g., manufactured by Premier Industries), and a two-way solenoid valve is used with a 24 VDC coil input, 6 Watts nominal operation range and a valve flow coefficient (Cv) of 0.155 (e.g., manufactured by GEMS Sensors and Controls).

To operate the system 500, the regulator 514 is adjusted to preset the pressure of the gas to be supplied to the torch 508 (e.g., to 60 psig). With the torch 508 being remotely located relative to the workpiece 501, a user pulls the trigger 509 to close the relay 510 and to activate the pilot arc circuit 512. The solenoid valve 516 is energized by the power source 504. The gas flow is established, and a pilot arc is initiated using the pilot arc circuit. At this point, the torch can be moved closer to the workpiece 501.

More specifically, with the relay 510 closed, the power source 504 supplies current and voltage to the pilot arc circuit 512, causing a pilot arc to form between the electrode and nozzle in the torch 508. Initiation of the gas flow via the valve 516 causes separation of the electrode and the nozzle, initiating an arc and igniting a plasma. With the plasma gas exiting the torch, the torch 508 is positioned in close proximity to the workpiece 501. The pilot arc and gas flow facilitate the formation of an electrical path between the workpiece 501 and the electrode. Eventually, a second arc forms between the electrode and workpiece. The pilot arc circuit 512 can be configured to provide a decreasing pilot arc current, so that the second arc remains as the pilot arc current goes to zero and pilot arc itself extinguishes. In one example, the torch 508 is capable of generating a transferred arc for about 30 seconds at 30 amps and 100 volts.

The elements as described in FIG. 6 can also be utilized to form a portable welding apparatus. The welding apparatus can include a power source, gas source, one or more controllers (similar to the controllers described in FIGS. 1-6 above) and transmission media (similar to the transmission media as described in FIGS. 1-6 above).

Figure 7A:
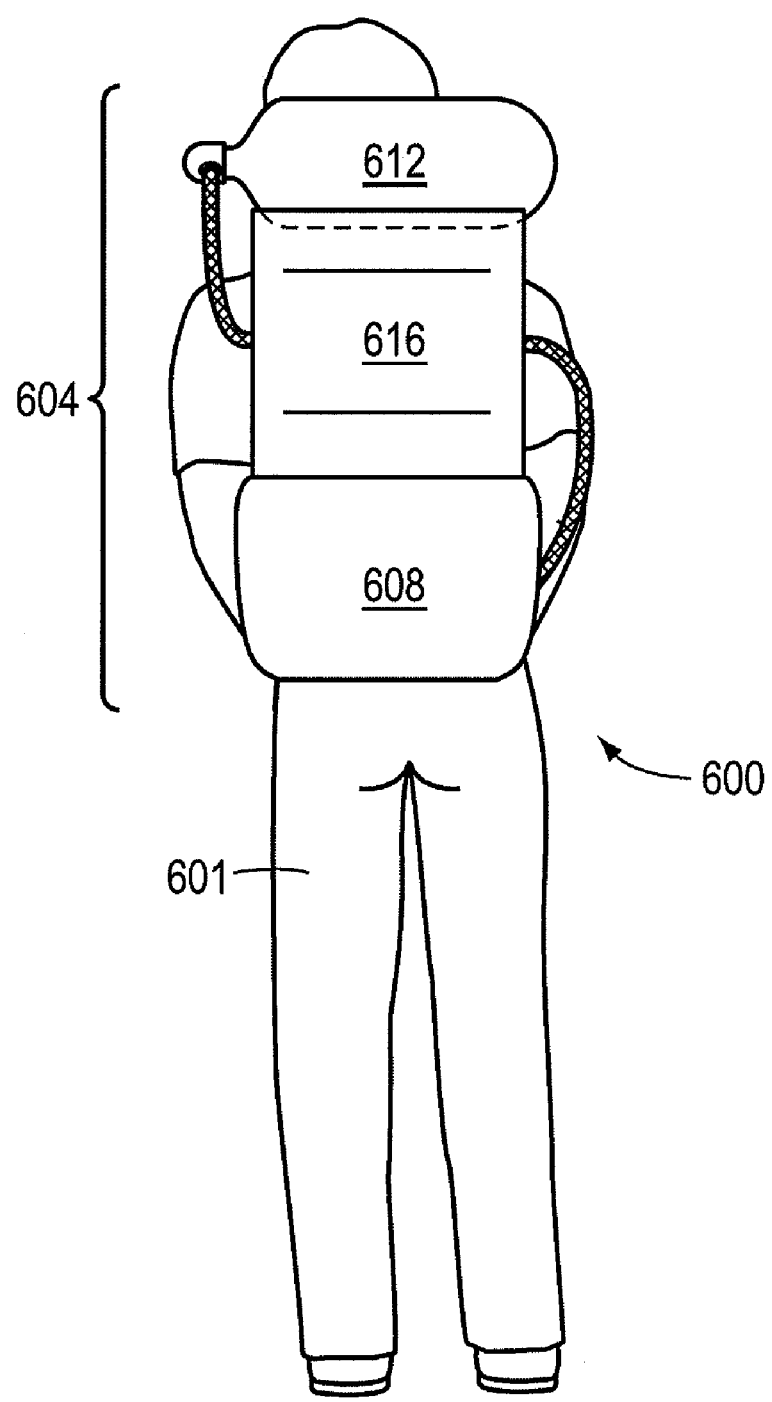
FIG. 7a is an illustration of a user with an exemplary wearable portable assembly of a plasma arc torch system.

FIG. 7a shows a user 601 with a wearable portable assembly 604. The plasma arc torch system 600 can include a wearable portable assembly 604 and a plasma delivery device (not shown). One or more rechargeable or replaceable power source(s) 608 and one or more rechargeable or replaceable gas source(s) 612 can be included in the wearable portable assembly 604. The power source 608 and gas source 612 can be removable. The power source 608 and gas source 612 can be similar to those as described above in FIGS. 1-6. In some embodiments, a plasma unit 616 can be included in the assembly 604. The plasma unit 616 can include one or more controllers 634 (similar to the controllers described in FIGS. 1-6 above) and a transmission medium 638 or transmission media (similar to the transmission media described in FIGS. 1-6 above). The power source 608 can include a plug outlet and the gas source 612 can include a "quick-connect" connector, allowing the user 601 to plug in the plasma unit 616 (such as a Powermax 30™ distributed by the Hypermax Corporation and manufactured by the Hypertherm) into the assembly 604.

The wearable portable assembly 604 can be a backpack, front-pack, and/or a shoulder strap mounted pack. In some embodiments, the wearable portable assembly 604 has a protective layer between the assembly 604 and the user 601 that is thermal resistant, electrically non-conductive, and/or impact resistant. The assembly 604 can be a breathable material to allow natural cooling of plasma unit 616 and power source 608. The assembly 604 can also include a central cooling chamber (not shown) that cools both the plasma unit 616 and the power source 608. The assembly 604 can be rigid, fireproof, and can include a bulletproof outer shell or frame. In some embodiments, the assembly 604 includes a consumable holder.

In some embodiments, the assembly 604 includes filament wound composite tanks. The power source 608, gas source 612, or plasma unit 616 can be enclosed by one or more composite tanks to reduce the weight of the assembly 604, increasing portability. A current regulator can be used in the power source 608 to increase portability of the assembly 604.

In some embodiments, the assembly 604 includes a power source 608 and a gas source 612 that stores power and gas. The assembly may not include a charging mechanism to increase portability of the assembly. In some embodiments, the power source 608 and gas source 612 of the assembly 604 can be recharged by plugging the assembly 604 into a wall. In some embodiments, the assembly 604 can be placed on or connected to a docking station (described further in FIG. 8 below) that recharges the power source 608 and/or gas source 612 while the assembly 604 is stored on the station.

In some embodiments, the assembly 604 includes a gas compressor that can be used as a gas source 612. The power source 608 can recharge the gas source 612 using a gas compressor. In some embodiments, pre-flow and post-flow steps are eliminated to preserve the power from the power source 608 and the gas from the gas source 612. Elimination of the pre-flow and post-flow steps can be applied to the embodiments as described in FIGS. 1-6 above to conserve power and gas.

In some embodiments, the plasma arc torch system 600 includes gas and power charge indicators that can be viewed by the user 601 without removing the assembly 604. The indicators can demonstrate a power remaining in the power source 608 or gas remaining in the gas source 612. In one embodiment, the indicators may be gauges located on the plasma delivery device. In another embodiment, the indicators may emit an audible signal to warn the user of low power and/or low gas.

Figure 7B:
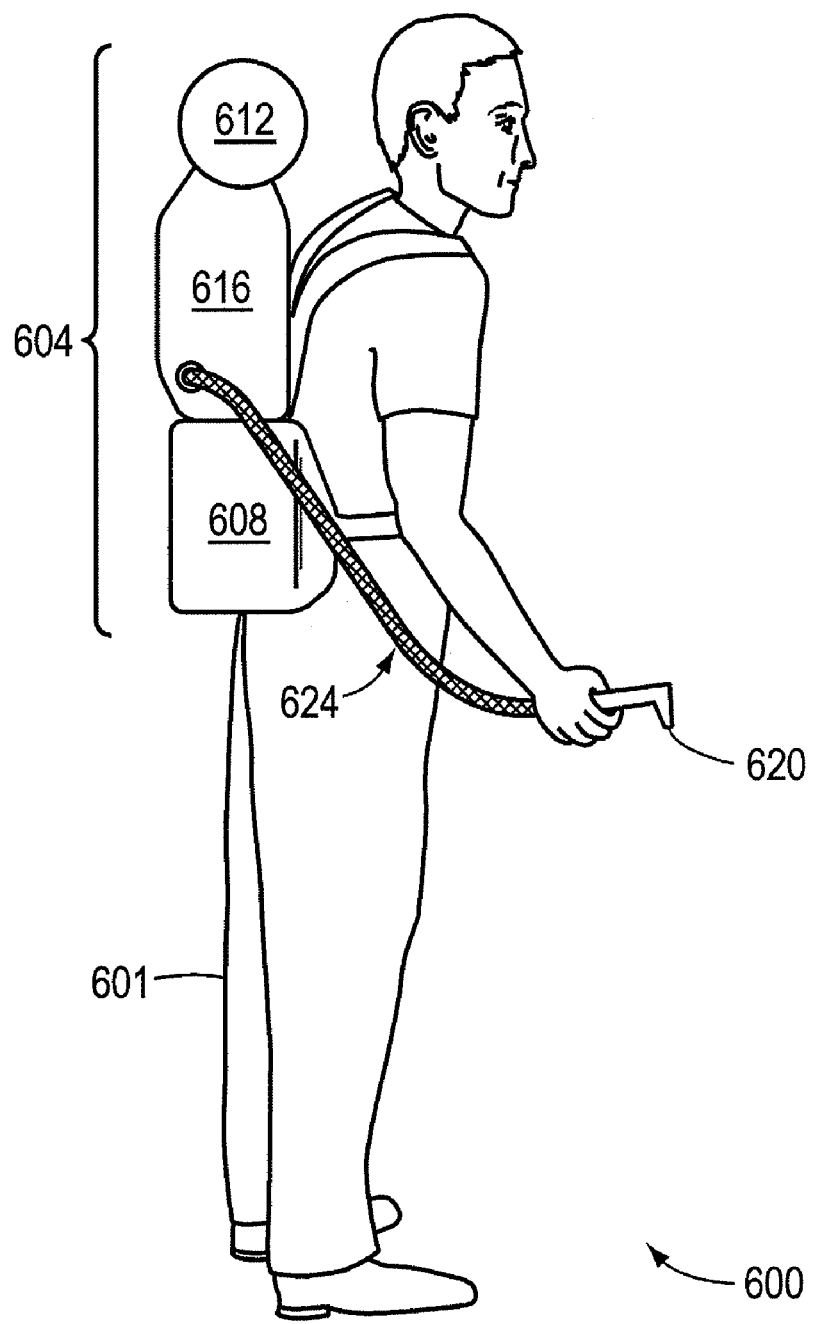
FIG. 7b is alternative view of the user with the exemplary wearable portable assembly and plasma delivery device of a plasma arc torch system.

FIG. 7b shows an alternative view of the user in FIG. 7a. The portable plasma arc torch system 600 includes a plasma delivery device 620 attached to the wearable assembly 604. In some embodiments, the plasma delivery device 620 includes a plasma torch that extends from the wearable portable assembly 604. The user 601 can wear the assembly 604 while operating the torch, allowing the user 601 to transport the plasma system 600. The assembly can also include a lead 624 to the plasma delivery device 620. In some embodiments, a reduced lead length to the plasma delivery device 620 can be formed to accommodate the arm length of a user 601 without having an excess lead.

The assembly 604 can be formed to have a low profile or can be formed to accommodate a helmet worn by the user 601. In some embodiments, the assembly 604 does not extend above a user's shoulders or includes a helmet cutout.

In some embodiments, the plasma torch system 600 includes a remote controller so that the user 601 can adjust the setting of the power source 608, plasma unit 616, and/or the gas source 612 without taking off the assembly 604. In some embodiments, the controls are mounted on the plasma delivery device 620.

The features of the wearable portable assembly 604 as described in FIGS. 7a-b, such as the power source 608, gas source 612, controllers 634, transmission media, materials used to form the assembly 604, gas and power indicators, and the structural design of the assembly 604 can be used for a portable welding apparatus.

Figure 8A:
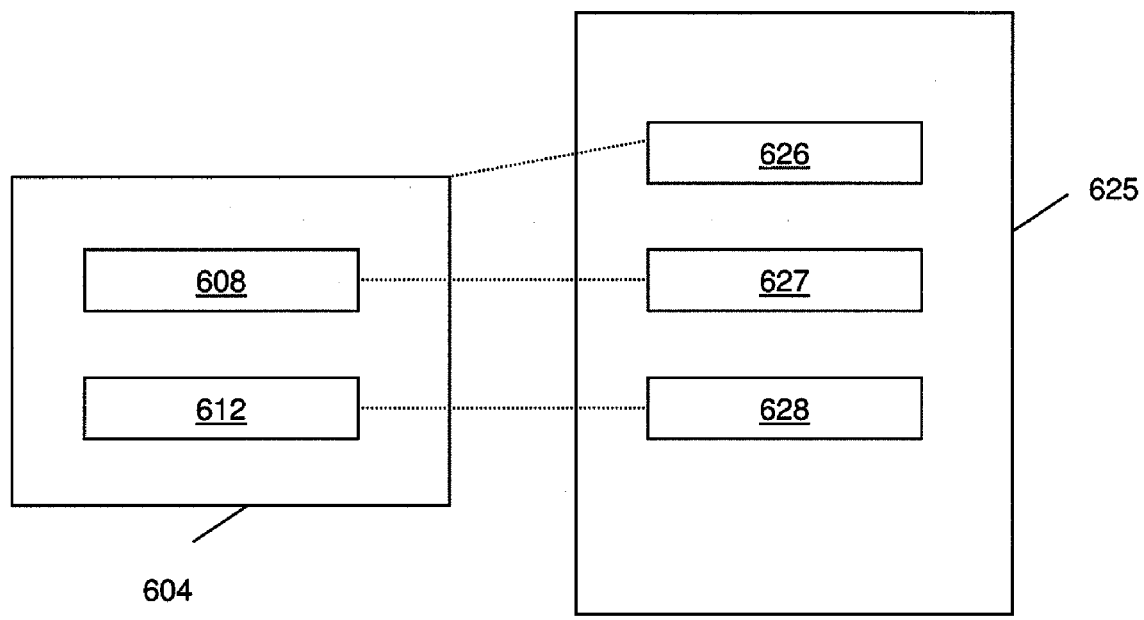
FIG. 8a is a block diagram of the components of a docking station for a wearable portable assembly, according to an illustrative embodiment.

FIG. 8a is a block diagram of the components of a docking station 625 for a wearable portable assembly 604, according to an illustrative embodiment. The docking station 625 includes a docking port 626 configured to receive the assembly 604 and a first connector 627 that electrically couples to the power source 608 when the assembly 604 is docked to the docking port 626 and provides power to recharge the power source 608. The docking station 625 also includes a second connector 628 that fluidly couples to the gas source 612 when the assembly 604 is docked to the docking port 626 and provides gas to recharge the gas source 612. In some embodiments, where the gas source 612 of the assembly 604 includes a compressor, the first connector 627 can be used to power the compressor to recharge the gas source 612.

Figure 8B:
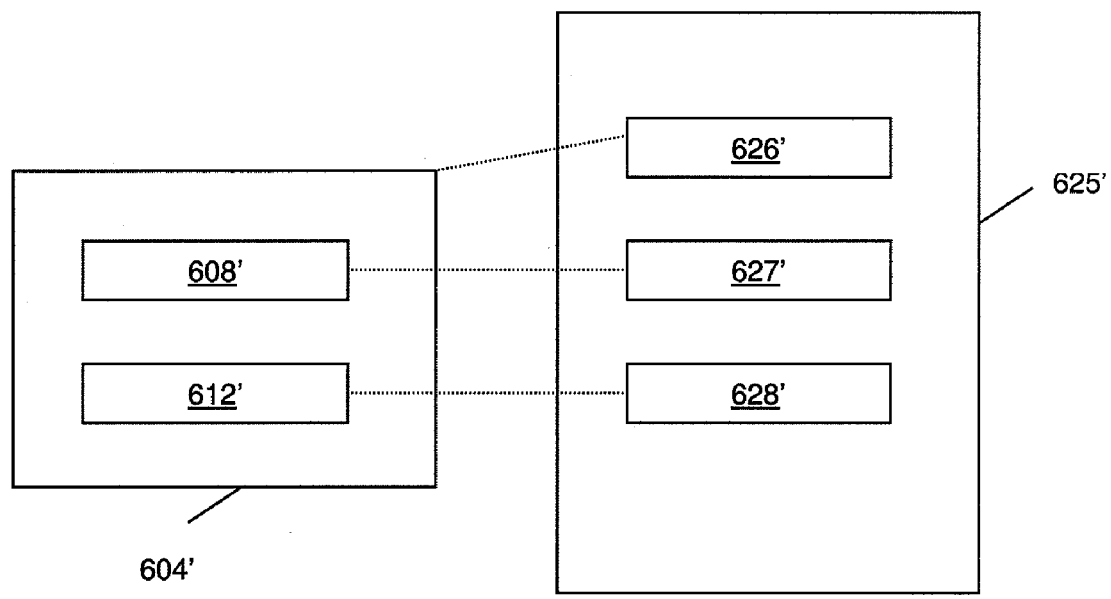
FIG. 8b is a block diagram of the components of a docking station for a portable plasma arc torch system, according to an illustrative embodiment.

FIG. 8b is a block diagram of the components of a docking station 625' for a portable plasma arc torch system 604' (similar to the exemplary embodiments described in FIGS. 1-6 above). The docking station 625' includes a port 626' configured to receive a portable plasma arc torch system 604'. The portable plasma arc torch system 604' has a power source 608' and a gas source 612' similar to the power sources and gas source described above in FIGS. 1-6. The docking station 625' includes a first connector 627' that electrically couples to the power source 608' when the system is docked to the docking port 626' and provides power to recharge the power source 608'. The docking station 625' also includes a second connector 628' that fluidly couples to the gas source 612' when the system is docked to the docking port 626' and provides gas to recharge the gas source 612'. In some embodiments, where the gas source 612' of the system includes a compressor, the first connector 627' can be used to power the compressor to recharge the gas source 612'.

Figure 8C:
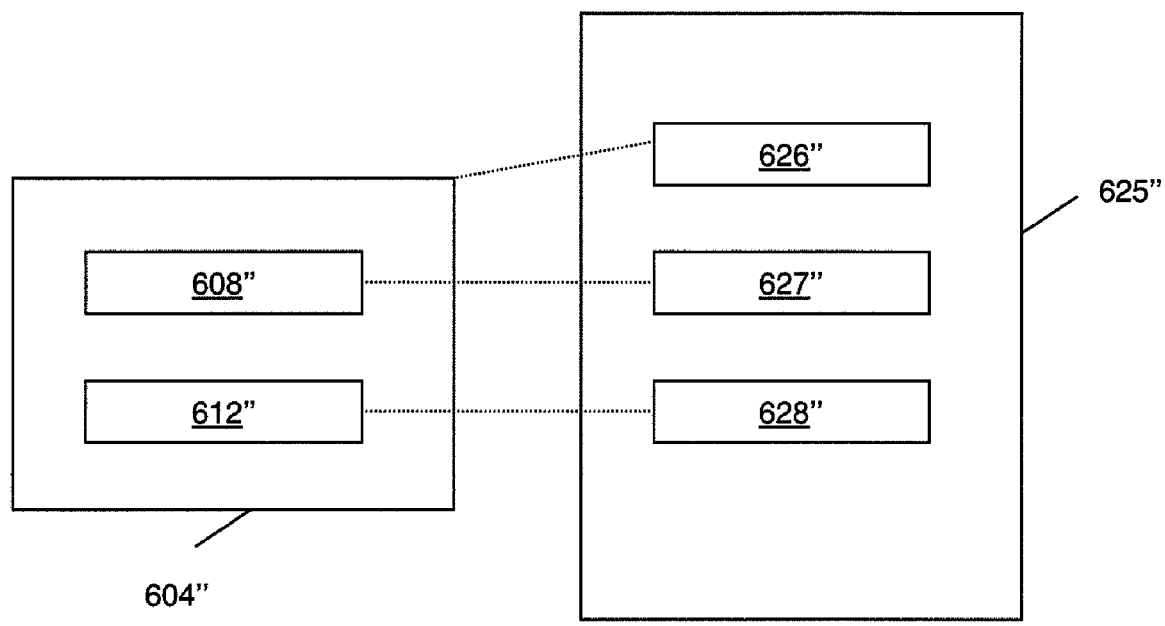
FIG. 8c is a block diagram of the components of a docking station for a portable welding apparatus, according to an illustrative embodiment.

FIG. 8c is a block diagram of the components of a docking station 625" for a portable welding apparatus 604". The docking station 625" includes a port 626" configured to receive the welding apparatus 604". The welding apparatus 604" also can include a power source 608" and/or a gas source 612". The docking station 625" includes a first connector 627" that electrically couples to the power source 608" when the system is docked to the docking port 626" and provides power to recharge the power source 608". The docking station 625" also includes a second connector 628" that fluidly couples to the gas source 612" when the system is docked to the docking port 626" and provides gas to recharge the gas source 612". In some embodiments, where the gas source 612" of the apparatus 604" includes a compressor, the first connector 627" can be used to power the compressor to recharge the gas source 612".

Figure 9:
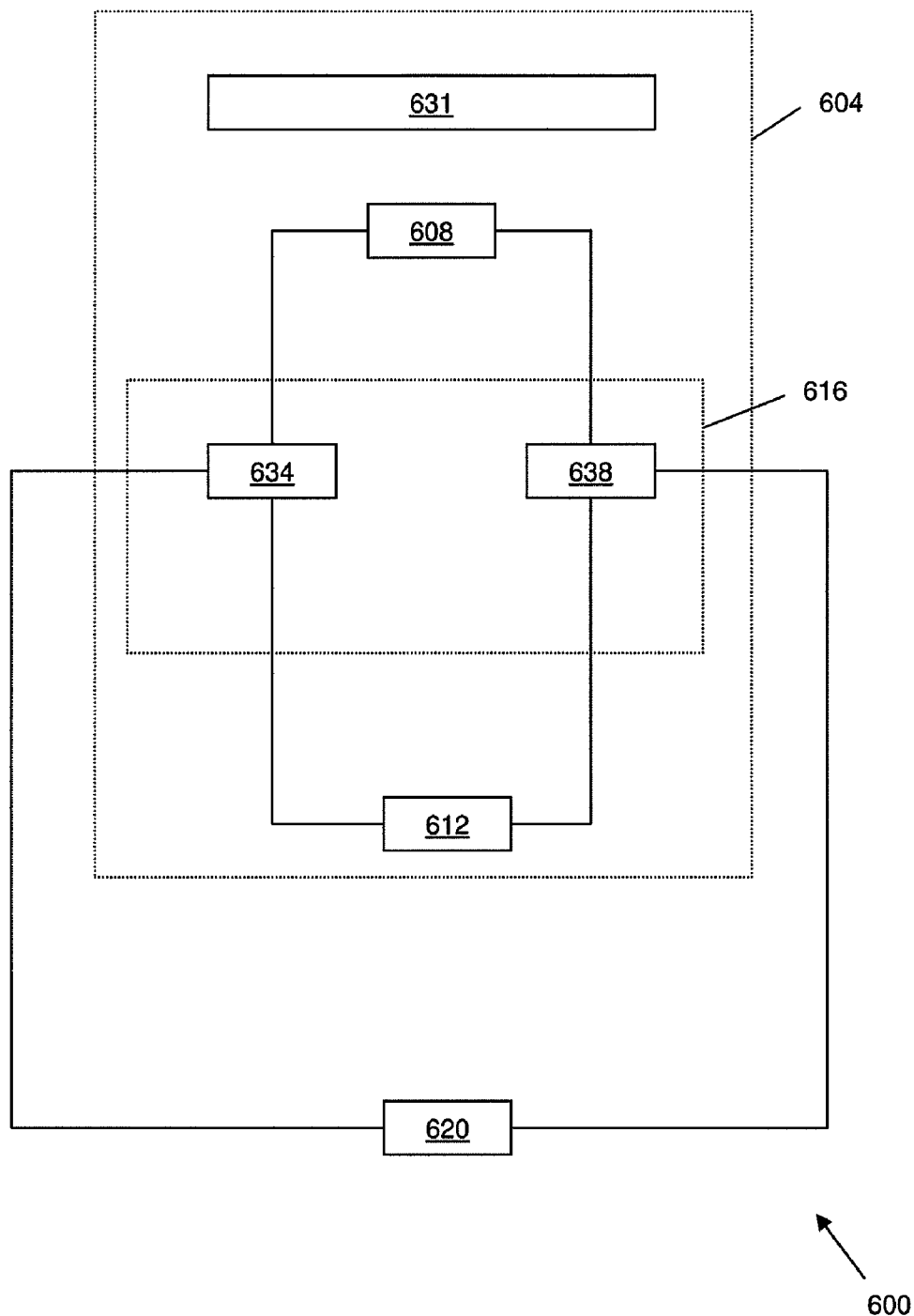
FIG. 9 is a block diagram of the components of an exemplary wearable portable assembly and plasma delivery device of a plasma arc torch system.

FIG. 9 is a block diagram of the components of the plasma arc torch system 600 including a wearable portable assembly 604. In addition to the power source 608, gas source 612 and plasma unit 616, the wearable assembly 604 can include a cooling device 631 that cools the plasma and the power source 608. In some embodiments, the cooling device 631 is a cooling chamber. In other embodiments, the cooling device 631 includes one or more cooling channels.

In some embodiments, the plasma unit 616 can include can include one or more controllers 634 (similar to the controllers described in FIGS. 1-6 above) and transmission medium 638 or transmission media (similar to the transmission media described in FIGS. 1-6 above). In some embodiments, the wearable portable plasma arc torch system 600 includes a control system with a pilot arc circuit 512, a solid state relay 510, pressure regulator 514, and/or solenoid valve 516 controlling the flow of current and/or gas as described above in FIG. 6.

Figure 10:
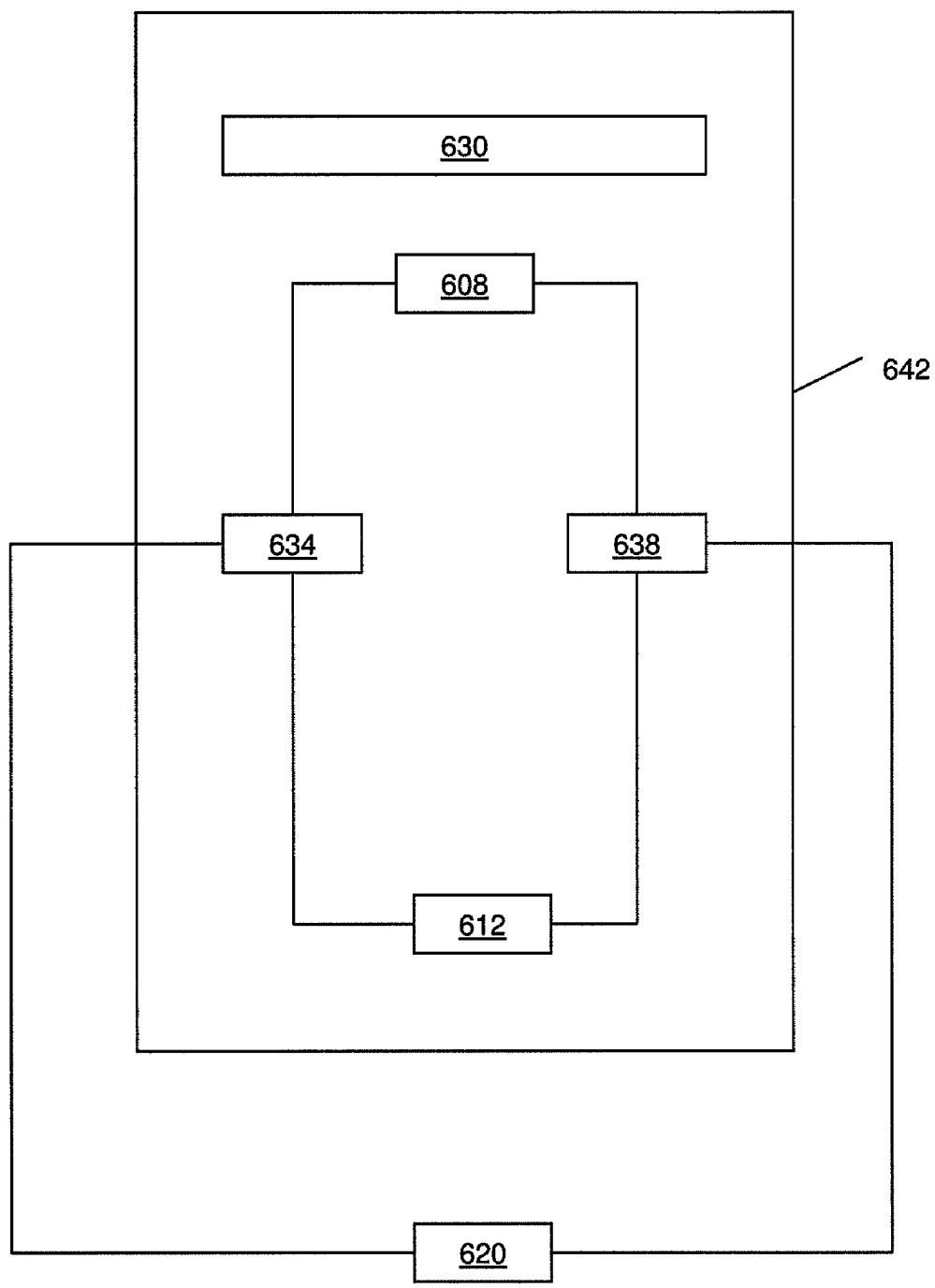
FIG. 10 is an example of a physical partitioning of the exemplary wearable portable assembly and plasma delivery device of the plasma arc torch system.

FIG. 10 is a block diagram of an exemplary physical partitioning of a wearable portable assembly 604. In some embodiments, the wearable assembly 604 is enclosed a housing 642. In some embodiments, the housing 642 is a flexible material and is configured to be a wearable assembly. In other embodiments, the housing 642 is disposed within the wearable assembly.

While FIG. 10 shows an example of the wearable assembly in a housing 642, other physical portioning arrangements can be used to enclose the assembly 604 or portions of the assembly. In some embodiments, one or more housing elements can be used to enclose the power source 608, gas source 612, plasma unit 616, or any combination thereof. In some embodiments, the housing is a flexible material and is configured to be a wearable assembly. In other embodiments, the housing is disposed within the wearable assembly.

In other embodiments, the power source 608, gas source 612, and plasma unit 616 are not enclosed in a housing, but are structurally connected to form the wearable assembly 604.

While the technology has been particularly shown and described with reference to specific embodiments, it should be understood by those skilled in the art that various changes in form and detail may be made therein without departing from the spirit and scope of the above description.

What is claimed is:

1. An autonomous plasma arc torch apparatus for processing materials comprising:
    a user-wearable portable assembly comprising i) a frame and at least one strap enabling the portable assembly to be wearable as a backpack, front-pack or shoulder strap mounted pack by a user, and ii) a replaceable or rechargeable power source and a replaceable or rechargeable gas source both being sized and configured to be attached to the frame; and
    a plasma delivery device, extending from the portable assembly, configured to receive current from the power source and gas from the gas source to generate a plasma arc, wherein the plasma delivery device is configured to receive power solely from the replaceable or rechargeable power source during operation of the apparatus without being connected to an electric power grid.

2. The plasma arc torch apparatus of claim 1 wherein the wearable portable assembly is a backpack.

3. The plasma arc torch apparatus of claim 1 further comprising a remote control device adapted to communicate with at least one of the power source or the gas source.

4. The plasma arc torch apparatus of claim 1 further comprising a control device on the plasma delivery device adapted to communicate with at least one of the power source or the gas source.

5. The plasma arc torch apparatus of claim 1 further comprising at least one of an indicator of power remaining in the power source or an indicator of a remaining gas in the gas source.

6. The plasma arc torch apparatus of claim 1 wherein the portable assembly further comprises a layer, wherein the layer is thermal resistant, electrically non-conductive, or impact resistant.

7. The plasma arc torch apparatus of claim 1 wherein the gas source comprises a compressor compressing a gas to be delivered to the plasma delivery device.

8. The plasma arc torch apparatus of claim 7 wherein the power source powers the compressor to recharge the gas source.

9. The plasma arc torch apparatus of claim 1 wherein the plasma delivery device is attachable to the wearable portable assembly.

10. The plasma arc torch apparatus of claim 1 wherein the portable assembly is attachable to a charging device configured to charge at least one of the power source or the gas source.

11. The plasma arc torch apparatus of claim 1 wherein the portable assembly comprises a filament wound composite tank.

12. The plasma arc torch apparatus of claim 1 further comprising a current regulator for regulating the current received by the plasma delivery device from the power source.

13. The plasma arc torch apparatus of claim 1 wherein the power source is a polymer lithium ion battery.

14. The plasma arc torch apparatus of claim 1 wherein the plasma delivery device is further configured to receive gas solely from the replaceable or rechargeable gas source during the operation of the apparatus without being connected to a continuous gas source.

15. An autonomous system comprising:
    a user-wearable portable assembly including a plasma arc torch system comprising i) a frame and at least one strap enabling the portable assembly to be wearable as a backpack, front-pack or shoulder strap mounted pack by a user, and ii) a replaceable or rechargeable power source and a replaceable or rechargeable gas source both being sized and configured to be attached to the frame,
    an arc delivery device, extending from the portable assembly, configured to receive power solely from the replaceable or rechargeable power source during operation of the system without being connected to an electric power grid; and
    a docking station attachable to the assembly, the docking station comprising at least one of a power supply for recharging the power source or a gas supply for recharging the gas source.

16. The system of claim 15 wherein the wearable portable assembly is a backpack.

17. A method for processing materials comprising:
    providing an autonomous plasma arc system comprising a plasma delivery device extending from a user-wearable portable assembly, the user-wearable portable assembly comprising i) a frame and at least one strap enabling the portable assembly to be wearable as a backpack, front pack or shoulder strap mounted pack by a user, and ii) a replaceable or rechargeable power source and a replaceable or rechargeable gas source both being sized and configured to be attached to the frame; and
    generating a plasma arc emanating from the plasma delivery device while the assembly is worn by a user, by providing thereto current from the power source and gas from the gas source,
    wherein the plasma delivery device is configured to receive power solely from the replaceable or rechargeable power source during operation of the system without being connected to an electric power grid.

18. A device for charging a user-wearable portable plasma arc torch apparatus comprising:
    a docking port configured to receive the user-wearable portable plasma arc torch apparatus, the user-wearable portable plasma arc torch apparatus comprising i) a frame and at least one strap enabling the portable assembly to be wearable as a backpack, front-pack or shoulder strap mounted pack by a user, and ii) a rechargeable power source and rechargeable gas source both being sized and configured to be attached to the frame;
    a first connector configured to electrically couple to the power source when the apparatus is docked to the docking port, the first connector providing power to recharge the power source; and a second connector configured to fluidly couple to the gas source when the apparatus is docked to the docking port, the second connector providing gas to recharge the gas source.

19. The device of claim 18 wherein at least one of the power source and gas source is removable.

20. A device for charging a user-wearable portable welding apparatus comprising:

a docking port configured to receive the user-wearable portable welding apparatus, the user-wearable portable welding apparatus comprising i) a frame and at least one strap enabling the portable assembly to be wearable as a backpack, front-pack or shoulder strap mounted pack by a user, and ii) a rechargeable power source and rechargeable gas source both being sized and configured to be attached to the frame;

a first connector configured to electrically couple to the power source when the apparatus is docked to the docking port, the first connector providing power to recharge the power source; and a second connector configured to fluidly couple to the gas source when the apparatus is docked to the docking port, the second connector providing gas to recharge the gas source.

21. An autonomous welding apparatus comprising:

a user-wearable portable assembly comprising i) a frame and at least one strap enabling the portable assembly to be wearable as a backpack, front-pack or shoulder strap mounted pack by a user, and ii) a replaceable or rechargeable power source and a replaceable or rechargeable gas source both being sized and configured to be attached to the frame; and a welding delivery device, extending from the portable assembly, configured to receive current from the power source and gas from the gas source to generate a welding arc, wherein the welding delivery device is configured to receive power solely from the replaceable or rechargeable power source during operation of the apparatus without being connected to an electric power grid.

* * * * *